(12) United States Patent
Yamada et al.

(10) Patent No.: US 12,081,295 B2
(45) Date of Patent: Sep. 3, 2024

(54) WIRELESS DEVICE, MANAGEMENT DEVICE, AND ANTENNA DIRECTION DETERMINATION METHOD

(71) Applicant: Panasonic Intellectual Property Management Co., Ltd., Osaka (JP)

(72) Inventors: Hideyuki Yamada, Hyogo (JP); Kazuki Hashimoto, Osaka (JP); Sotaro Shinkai, Osaka (JP); Hiroshi Ohue, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 253 days.

(21) Appl. No.: 17/846,313

(22) Filed: Jun. 22, 2022

(65) Prior Publication Data
US 2022/0416864 A1    Dec. 29, 2022

(30) Foreign Application Priority Data
Jun. 23, 2021 (JP) ................................. 2021-104259

(51) Int. Cl.
*H04B 7/06* (2006.01)

(52) U.S. Cl.
CPC ................. *H04B 7/0617* (2013.01)

(58) Field of Classification Search
CPC ..... H04B 7/0617; H04B 7/0695; H04B 7/086; H04B 7/088
USPC ........................................................ 375/260
See application file for complete search history.

(56) References Cited

U.S. PATENT DOCUMENTS

2001/0053697 A1* 12/2001 Nakada ............. H04W 74/0875
455/456.2

FOREIGN PATENT DOCUMENTS

JP    2016-156652    9/2016

* cited by examiner

*Primary Examiner* — Fitwi Y Hailegiorgis
(74) *Attorney, Agent, or Firm* — Wenderoth, Lind & Ponack, L.L.P.

(57) ABSTRACT

A wireless device is configured to perform wireless communication with one or more terminals and includes an antenna configured to perform wireless communication, a wireless interface configured to perform wireless communication with the one or more terminals through the antenna, and a processor configured to acquire an azimuth and a weighting coefficient of each of the one or more terminals, and determine a direction of the antenna based on the azimuth and the weighting coefficient of each of the one or more terminals.

13 Claims, 8 Drawing Sheets

|  | AZIMUTH [°] | DISTANCE [m] |
|---|---|---|
| TERMINAL 20A | -10 | 200 |
| TERMINAL 20B | +20 | 50 |
| TERMINAL 20C | +30 | 100 |

WIRELESS DEVICE, MANAGEMENT DEVICE, AND ANTENNA DIRECTION DETERMINATION METHOD

CROSS-REFERENCE TO RELATED APPLICATIONS

This application is based on and claims priority under 35 USC 119 from Japanese Patent Application No. 2021-104259 filed on Jun. 23, 2021, the contents of which are incorporated herein by reference.

TECHNICAL FIELD

The present disclosure relates to a wireless device, a management device, and an antenna direction determination method.

BACKGROUND ART

There is known a technique of estimating a position of a terminal by transmitting and receiving a wireless signal between a wireless access point (hereinafter referred to as an AP) and the terminal which is capable of wireless communication.

JP-A-2016-156652 discloses a method in which a terminal measures received signal power strength of wireless signals transmitted from an AP and another terminal, and transmits a measurement result of the received signal power strength to the AP, the AP measures received signal power strength of a wireless signal transmitted from the terminal, and the AP estimates a position of the terminal using position candidate information that describes terminal installation position candidates for each device type, a measurement result of the received signal power strength measured by the own device, and the measurement result of the received signal power strength measured by each terminal.

When an AP includes a directional antenna, a range in which a terminal can communicate with the AP changes depending on a direction of the antenna. When a plurality of terminals are wirelessly connected to the AP, it is difficult to determine an antenna direction appropriate for wireless communication with the plurality of terminals.

SUMMARY OF INVENTION

An object of the present disclosure is to provide a wireless device, a management device, and an antenna direction determination method capable of directing a directional antenna included in the wireless device to an appropriate azimuth of the antenna.

Aspect of non-limiting embodiments of the present disclosure relates to provide a wireless device configured to perform wireless communication with one or more terminals, the wireless device including: an antenna configured to perform wireless communication, a wireless interface configured to perform wireless communication with the one or more terminals through the antenna, and a processor configured to acquire an azimuth and a weighting coefficient of each of the one or more terminals, and determine a direction of the antenna based on the azimuth and the weighting coefficient of each of the one or more terminals.

Also, aspect of non-limiting embodiments of the present disclosure relates to provide a management device connectable to the wireless device, including: a display device, and a processor configured to cause the display device to display information indicating a difference between the direction of the antenna determined by the wireless device and a current direction of the antenna of the wireless device.

Further, aspect of non-limiting embodiments of the present disclosure relates to provide an antenna direction determination method for determining a direction of an antenna provided on a wireless device and configured to perform wireless communication, the antenna direction determination method including: acquiring an azimuth and a weighting coefficient of each of one or more terminals, and determining the direction of the antenna based on the azimuth and the weighting coefficient of each of the one or more terminals.

These comprehensive or specific aspects may be implemented by a system, a device, a method, an integrated circuit, a computer program, or a recording medium, or may be implemented by any combination of the system, the device, the method, the integrated circuit, the computer program, and the recording medium.

According to the present disclosure, it is possible to provide the wireless device, the management device, and the antenna direction determination method capable of directing the directional antenna included in the wireless device to the appropriate azimuth of the antenna.

DESCRIPTION OF EMBODIMENTS

Hereinafter, an embodiment of the present disclosure will be described in detail with reference to the drawings as appropriate. However, unnecessarily detailed description may be omitted. For example, detailed description of well-known matters and redundant description of substantially the same configuration may be omitted. This is to avoid unnecessary redundancy of the following description and to facilitate understanding of those skilled in the art. The accompanying drawings and the following description are provided for those skilled in the art to fully understand the present disclosure, and are not intended to limit the subject matter described in the claims.

Embodiment

Configuration of Wireless Communication System

Figure 1:
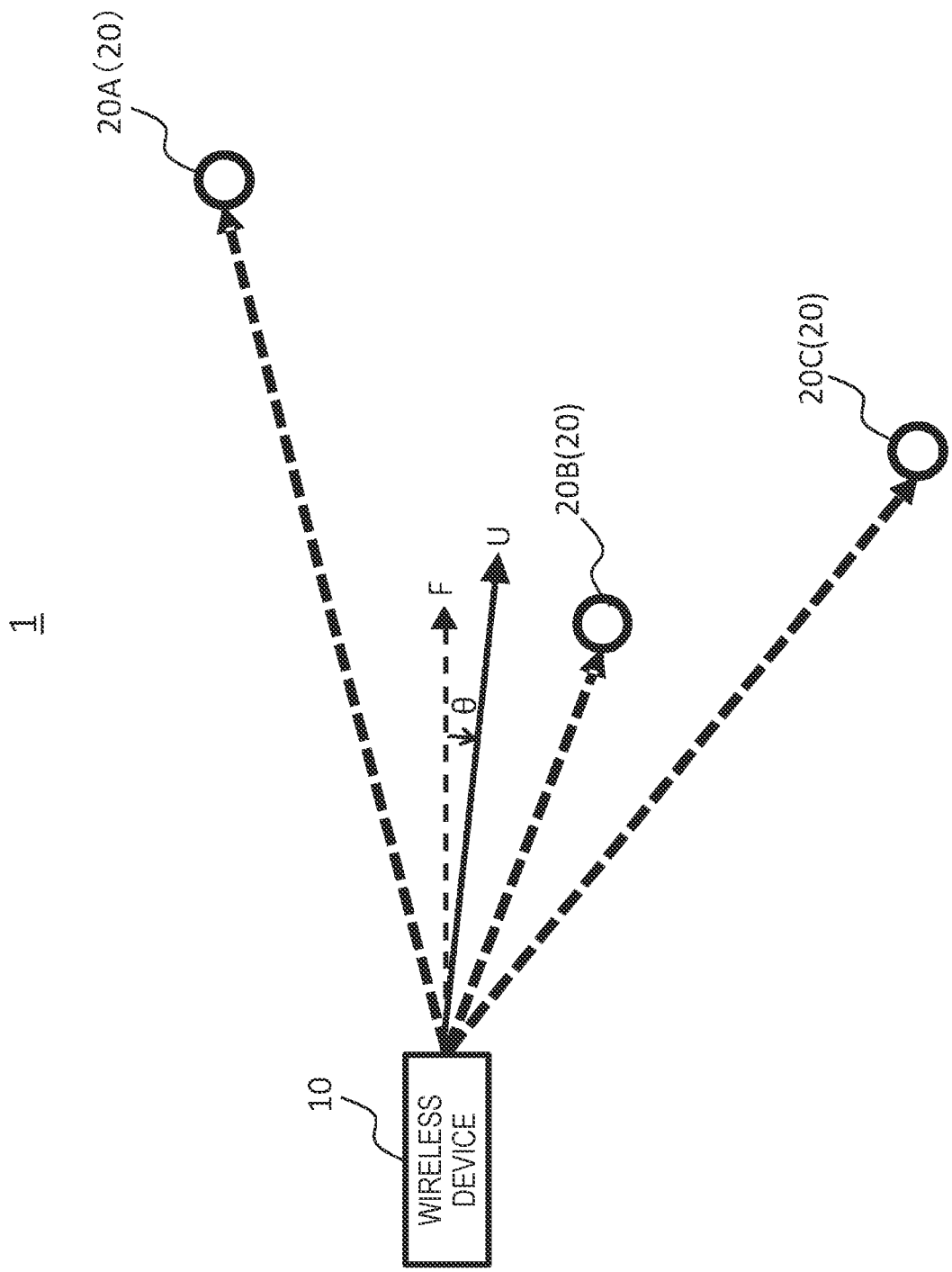
FIG. 1 is a schematic diagram showing an example of a wireless communication system according to an embodiment.

FIG. 1 is a schematic diagram showing an example of a wireless communication system 1 according to an embodiment. FIG. 1 is a plan view of the wireless communication system 1 as viewed from above.

The wireless communication system 1 includes a wireless device 10 and at least one terminal 20. The wireless device 10 is also referred to as an access point (AP). The terminal 20 is also referred to as a station (STA). A position of the terminal 20 may be fixed, or the terminal 20 may be a moving object. As examples of the terminal 20, three terminals 20A, 20B, and 20C are shown in FIG. 1. The wireless communication system 1 may further include a management device 30 which will be described later with reference to FIG. 2.

The terminal 20 can wirelessly communicate with the wireless device 10. The communication between the wireless device 10 and the terminal 20 is performed by millimeter wave communication. The wireless device 10 includes an antenna capable of millimeter wave communication. Since a beam (radio wave) used for the millimeter wave communication is directional, it is necessary to direct the antenna into an appropriate direction at the time of communication. For example, when an operator installs the wireless device 10, the antenna can be directed into the appropriate direction by adjusting a direction of a main body of the wireless device 10. It should be noted that the wireless device 10 and the terminal 20 may perform wireless communication using a radio wave whose wavelength is different from a millimeter wave band.

When there is only one terminal 20 that performs wireless communication with the wireless device 10, the operator who installs the wireless device 10 may direct the antenna of the wireless device 10 toward the one terminal 20. However, in a case where there are a plurality of terminals 20 that perform wireless communication with the wireless device 10, the operator does not know which direction the antenna of the wireless device 10 should be appropriately directed.

Therefore, in the embodiment of the present disclosure, a device including a processor determines the appropriate direction of the antenna of the wireless device 10. As a result, wireless communication between the wireless device 10 and the plurality of terminals 20 is stabilized. The device including the processor may be, for example, the wireless device 10 or the management device 30.

Configuration Example of Wireless Device and Management Device

Figure 2:
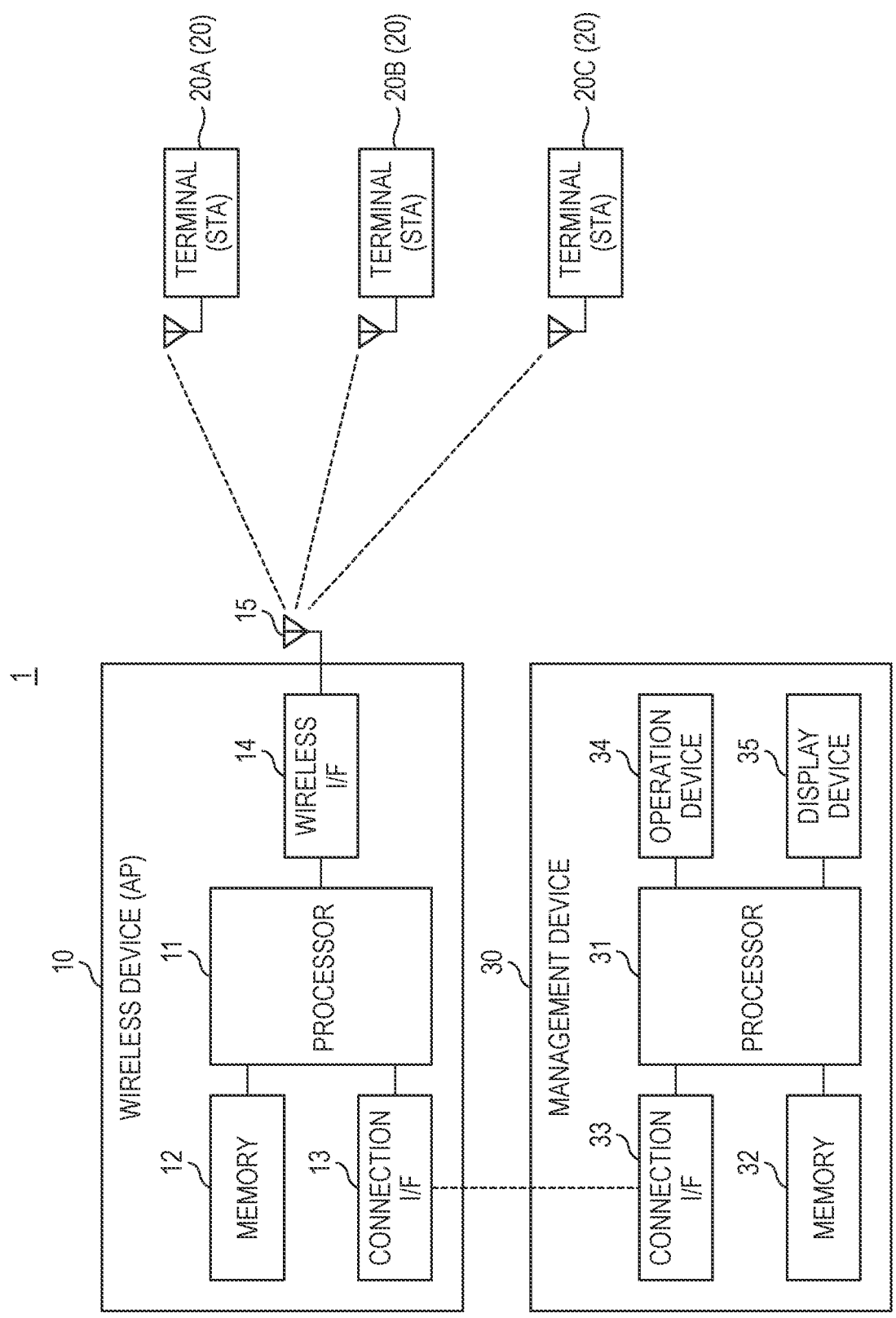
FIG. 2 is a block diagram showing a configuration example of a wireless device and a management device according to the present embodiment.

FIG. 2 is a block diagram showing a configuration example of the wireless device 10 and the management device 30 according to the present embodiment. The wireless device 10 that operates as the AP includes a processor 11, a memory 12, a connection interface 13, and a wireless interface 14. The wireless device 10 also includes an antenna 15 or is connected to the antenna 15.

The processor 11 is constituted by, for example, a central processing unit (CPU), a micro processing unit (MPU), a digital signal processor (DSP), or a field programmable gate array (FPGA). The processor 11 performs a control process for controlling overall operations of the units 12 to 14 of the wireless device 10.

The memory 12 may include a read-only memory (ROM), a random access memory (RAM), a flash memory, or the like, and stores various programs to be executed by the processor 11 and various data.

The connection interface 13 is an interface configured to perform communication connection with an external device such as the management device 30 to be described later. The connection interface 13 includes a communication circuit corresponding to wired communication or wireless communication. The wireless interface 14 is an interface capable of performing wireless communication with each terminal 20 through the antenna 15. The wireless interface 14 includes a communication circuit corresponding to wireless communication.

The antenna 15 is an antenna capable of wireless communication using a beam that has directivity (directional beam). The wireless communication using the beam that has directivity includes millimeter wave communication. The antenna 15 may be an array antenna including a plurality of antenna elements.

The management device 30 is, for example, a smartphone, a tablet, a personal computer, or the like. The management device 30 may also be another device. In addition, the management device 30 may also be integrated with the wireless device 10.

The management device 30 includes a processor 31, a memory 32, a connection interface 33, an operation device 34, and a display device 35.

The processor 31 is constituted by using, for example, a CPU, an MPU, a DSP, or an FPGA. The processor 31 performs a control process for controlling overall operations of the units 32 to 35 of the management device 30.

The memory 32 may include a ROM, a RAM, a flash memory, or the like, and stores various programs to be executed by the processor 31 and various data.

The connection interface 33 is an interface configured to perform communication with an external device such as the wireless device 10. The connection interface 33 includes a communication circuit corresponding to wired communication or wireless communication.

The operation device 34 is a device that receives an input operation performed by a user, and may be constituted by using, for example, a mouse, a keyboard, a lever, a button, a touch panel, or the like.

The display device 35 is a device that displays information to the user, and may be constituted by using a display, a touch panel, or the like.

Figure 3:
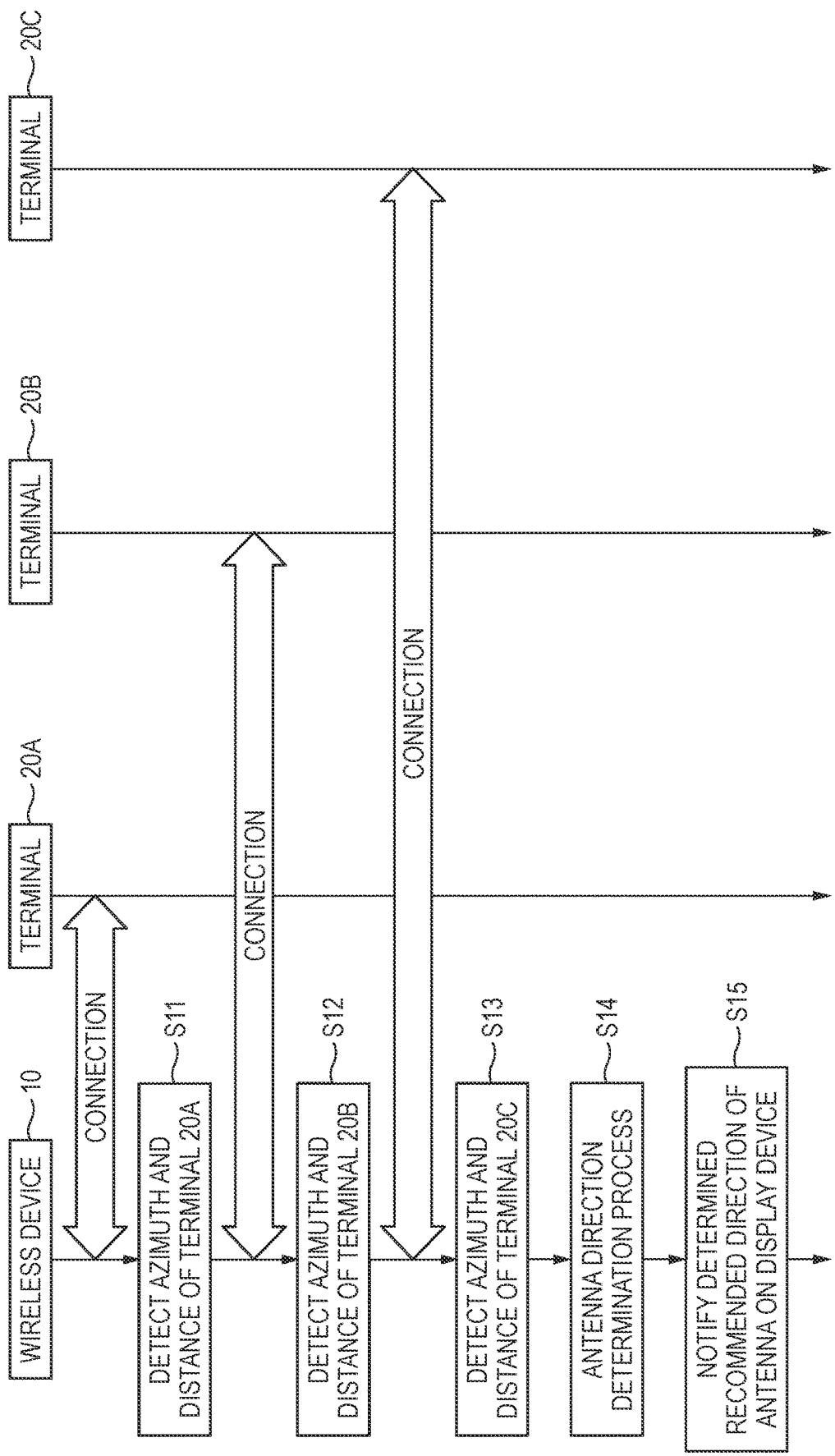
FIG. 3 is a sequence diagram showing an example of an antenna direction determination process of the wireless device according to the present embodiment.

FIG. 3 is a sequence diagram showing an example of an antenna direction determination process of the wireless device 10.

When the wireless device 10 is wirelessly connected to the terminal 20A, the wireless device 10 detects an azimuth where the terminal 20A is located and a distance to the terminal 20A (step S11) from the wireless device 10. When the wireless device 10 is wirelessly connected to the terminal 20B, the wireless device 10 detects an azimuth where the terminal 20B is located and a distance to the terminal 20B from the wireless device 10 (step S12). When the wireless device 10 is wirelessly connected to the terminal 20C, the wireless device 10 detects an azimuth where the terminal 20C is located and a distance to the terminal 20C from the wireless device 10 (step S13).

After detecting the azimuths and the distances of the terminals 20, the wireless device 10 performs the antenna direction determination process (step S14). Details of the antenna direction determination process will be described later. Then, the wireless device 10 notifies a determined recommended direction U of the antenna 15 (step S15). The notification of the recommended direction U of the antenna 15 is performed, for example, relative to the display device 35 included in the management device 30.

Figures 4, 5:
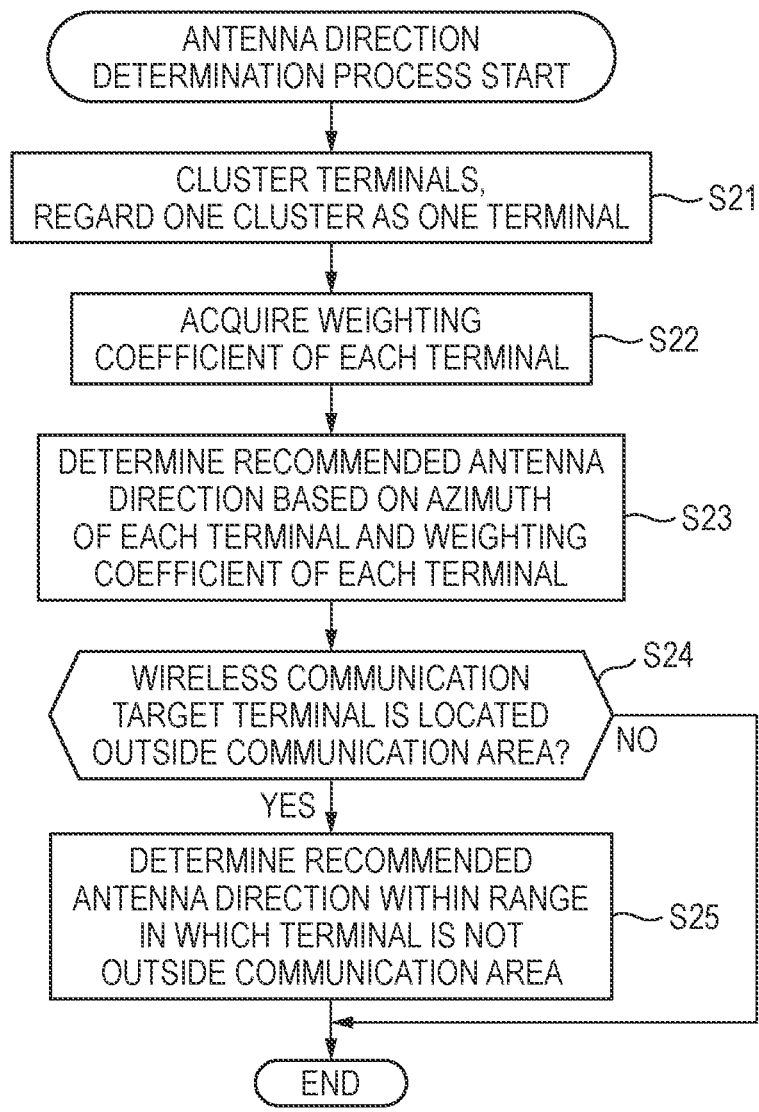
FIG. 4 shows azimuths and distances of terminals relative to the wireless device according to the present embodiment.
FIG. 5 is a flowchart showing an example of the antenna direction determination process according to the present embodiment.

Here, an example of detecting the azimuths and the distances of the terminals 20 in steps S11 to S13 will be described with reference to FIG. 4. FIG. 4 shows the azimuths and the distances of the terminals 20 relative to the wireless device 10.

In order to detect the azimuths and the distances of the terminals 20 relative to the wireless device 10, the wireless device 10 specifies an azimuth where received power (for example, received signal strength indicator (RSSI)) of a radio wave is strong by a sector sweep in beam forming. Then, the wireless device 10 estimates that the terminal 20 is present in the azimuth where the received power (RSSI) is strong (for example, equal to or higher than a predetermined threshold). The wireless device 10 estimates the distance to the terminal 20 based on a time until a signal is returned from each terminal 20, the received power (RSSI), and the like. FIG. 4 shows the azimuths and the distances of the terminals 20 estimated in this manner. The terminal 20A is estimated to be present at a position whose azimuth is −10 degrees relative to an original antenna direction F of the wireless device 10 at a distance of 200 m from the wireless device 10. The terminal 20B is estimated to be present at a position whose azimuth is +20 degrees relative to the current direction F of the antenna 15 of the wireless device 10 at a distance of 50 m from the wireless device 10. The terminal 20C is estimated to be present at a position whose azimuth is +30 degrees relative to the current direction F of the antenna 15 of the wireless device 10 at a distance of 100 m from the wireless device 10. In the present embodiment, a clockwise direction from the current direction F of the antenna 15 is defined as plus (+), and a counterclockwise direction from the current direction F of the antenna 15 is defined as minus (−). However, the clockwise direction from the current direction F of the antenna 15 may be defined as minus (−), and the counterclockwise direction from the current direction F of the antenna 15 may be defined as plus (+).

The method of estimating the azimuths and the distances of the terminals 20 relative to the wireless device 10 is not limited to the above method. The azimuths and the distances of the terminals 20 may also be determined based on other known methods. For example, when the wireless device 10 and the terminals 20 are fixedly installed, the relative azimuths and distances therebetween do not change. In this case, values indicating the azimuths and the distances of the terminals 20 may be stored in the memory 12 or the memory 32. The wireless device 10 may acquire the values indicating the azimuths and the distances of the terminals 20 from the memory 12 or the memory 32.

Next, the antenna direction determination process in step S14 will be described. FIG. 5 is a flowchart showing an example of the antenna direction determination process.

The processor 11 clusters the terminals (step S21). The clustering will be described later with reference to FIG. 6. Then, the processor 11 regards one cluster as one terminal 20, and executes step S22 and the subsequent steps.

The processor 11 acquires a weighting coefficient of each terminal 20 (step S22). The processor 11 may acquire the weighting coefficient by dynamically calculating the weighting coefficient, or may acquire the weighting coefficient stored in the memory 12, the memory 32, or the like.

The processor 11 determines the recommended direction U of the antenna 15 based on the azimuths of the terminals 20 and the weighting coefficients of the terminals 20 (step S23).

The processor 11 determines whether there is any wireless communication target terminal located outside a communication area when the antenna 15 is set in the determined recommended direction U of the antenna 15 (step S24). When there is a wireless communication target terminal located outside the communication area (step S24: YES), the process proceeds to step S25. When there is no wireless communication target terminal 20 located outside the communication area (step S24: NO), the process shown in the flowchart is ended.

In step S25, the processor 11 determines the recommended direction U of the antenna 15 within a range in which the wireless communication target terminal 20 among the terminals 20 is not outside the communication area (step S25).

In a case where wireless connection between the wireless device 10 and one or more of the plurality of terminals 20 is disconnected, the processor 11 may perform each step shown in FIG. 5 again so as to determine the appropriate recommended direction U of the antenna 15 for the plurality of terminals 20 that are not disconnected. Examples of the case where the wireless connection with the terminal 20 is disconnected include a case where the terminal 20 fails or is relocated.

The weighting coefficient acquired by the processor 11 in step S22 will be described. As a first example of the weighting coefficient, the weighting coefficient may be defined based on the distance between the wireless device 10 and each terminal 20. For example, the weighting coefficient of the terminal 20 that is distant from the wireless device 10 is larger than the weighting coefficient of the terminal 20 that is nearby the wireless device 10. It is considered that communication quality of the distant terminal 20 is lower than that of the nearby terminal 20. Therefore, by setting the weighting coefficient of the distant terminal 20 to be larger than the weighting coefficient of the nearby terminal 20, it is possible to allow beams in beam forming to reach the terminals 20 without imbalance.

As a second example of the weighting coefficient, the weighting coefficient may be defined based on strength of the received power (RSSI) in the wireless device 10. For example, the weighting coefficient of the terminal 20 with weak received power in the wireless device 10 is larger than the weighting coefficient of the terminal 20 with strong received power in the wireless device 10. It is considered that communication quality of the terminal 20 with weak received power is lower than that of the terminal 20 with strong received power. Therefore, by setting the weighting coefficient of the terminal 20 with weak received power to be larger than the weighting coefficient of the terminal 20 with strong received power, it is possible to allow beams in beam forming to reach the terminals 20 without imbalance.

As a third example of the weighting coefficient, the weighting coefficient may be defined based on importance of the terminal 20. The weighting coefficient of the terminal 20 with high importance is larger than the weighting coefficient of the terminal 20 with low importance. There are various viewpoints for defining the importance of the terminal 20. For example, there are viewpoints of defining the importance based on importance of information processing performed by the terminal 20, the number of users who use the terminal 20, and the like. Therefore, by setting the weighting coefficient of the terminal 20 with high importance to be larger than the weighting coefficient of the terminal 20 with low importance, the direction of the antenna 15 can be directed into an azimuth where communication quality is improved for the terminal 20 with high importance.

It should be noted that criteria for determining magnitude of the weighting coefficient is not limited to the first to third examples described above.

Next, the recommended direction U of the antenna 15 determined by the processor 11 in step S23 will be exemplified. It is assumed that the terminals 20 to communicate with the wireless device 10 are the three terminals 20A, 20B, and 20C. It is assumed that the azimuths of the terminals 20 relative to the current direction F of the antenna 15 of the wireless device 10 and the distances from the wireless device 10 are as shown in FIG. 4. In this case, an angle θ formed by the current direction F of the antenna 15 and the recommended direction U of the antenna 15 determined by the processor 11 may be calculated by the following formula (1).

$$\theta = (-10 \times 4 + 20 \times 1 + 30 \times 2)/3 = 13 \text{ degrees} \quad (1)$$

In formula (1), "−10", "20", and "30" correspond to the azimuths of the terminals 20A, 20B, and 20C, respectively in view from the wireless device 10. In formula (1), "4", "1", and "2" correspond to weighting coefficients based on the distances from the wireless device 10 to the terminals 20A, 20B, and 20C, respectively. Here, ratios of the distances are used as the weighting coefficients. That is, 200:50:100=4:1:2.

Figure 6:
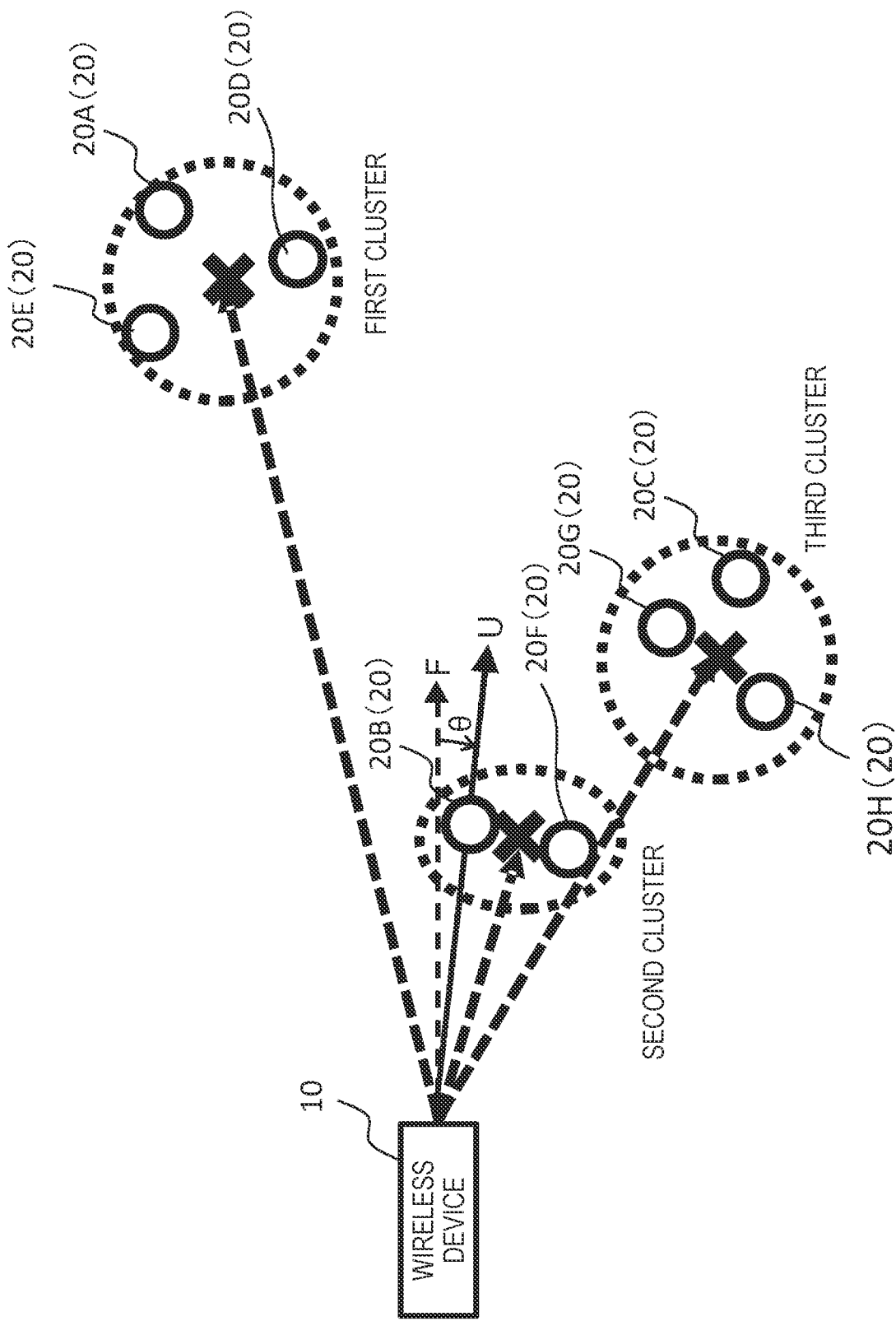
FIG. 6 is a conceptual diagram showing clustering of a plurality of terminals according to the present embodiment.

Next, the clustering of the terminals 20 will be described. FIG. 6 is a conceptual diagram showing the clustering of the plurality of terminals 20. FIG. 6 is a plan view of the wireless device 10 and the plurality of terminals 20 as viewed from above. It should be noted that it is not essential to perform the clustering shown in step S21. For example, in a case where the number of terminals 20 is small or in a case where the terminals 20 are uniformly arranged, the antenna 15 may be capable of being directed into an appropriate azimuth without performing the clustering. However, in a case where there are a large number of terminals 20, the antenna 15 can be directed into the appropriate azimuth more efficiently when the clustering is performed. This is because an amount of calculation of the wireless device 10 may be reduced. In addition, when the clustering is performed, even in a case where an arrangement of the terminals 20 is imbalanced, the antenna 15 may be capable of being directed into a direction where favorable communication quality can be ensured for more terminals 20.

As conceptually shown in FIG. 6, the plurality of terminals 20 may be intensively arranged in the vicinity of each other. In such a case, the processor 11 can perform clustering such that at least one terminal 20 belongs to one cluster, and determines the weighting coefficient described above by regarding the cluster as one terminal.

The processor 11 performs the clustering in step S21 described with reference to FIG. 5. An algorithm used for the clustering may be a known algorithm such as a k-means method. In the embodiment shown in FIG. 6, the processor 11 clusters terminals 20A, 20D, and 20E as a first cluster. In addition, the processor 11 clusters terminals 20B and 20F as a second cluster. In addition, the processor 11 clusters terminals 20C, 20G, and 20H as a third cluster.

When one cluster is regarded as one terminal, the processor 11 may calculate an azimuth and a distance relative to the wireless device 10 based on a position of a center of gravity between a plurality of terminals belonging to the cluster. In FIG. 6, positions of centers of gravity of the first cluster to the third cluster are indicated by cross marks.

In the case of the second example of the weighting coefficient, the processor 11 may calculate received power (RSSI) in the cluster as an average value of received power (RSSI) in the plurality of terminals belonging to the cluster.

In the case of the third example of the weighting coefficient, the processor 11 may determine the weighting coefficient such that importance of a terminal with highest importance among the plurality of terminals 20 belonging to the cluster serves as importance of the cluster. In addition, the processor 11 may determine the weighting coefficient such that an average value of importance of the plurality of terminals 20 belonging to the cluster serves as the importance of the cluster.

<Adjustment of Antenna Direction>

Figure 7:
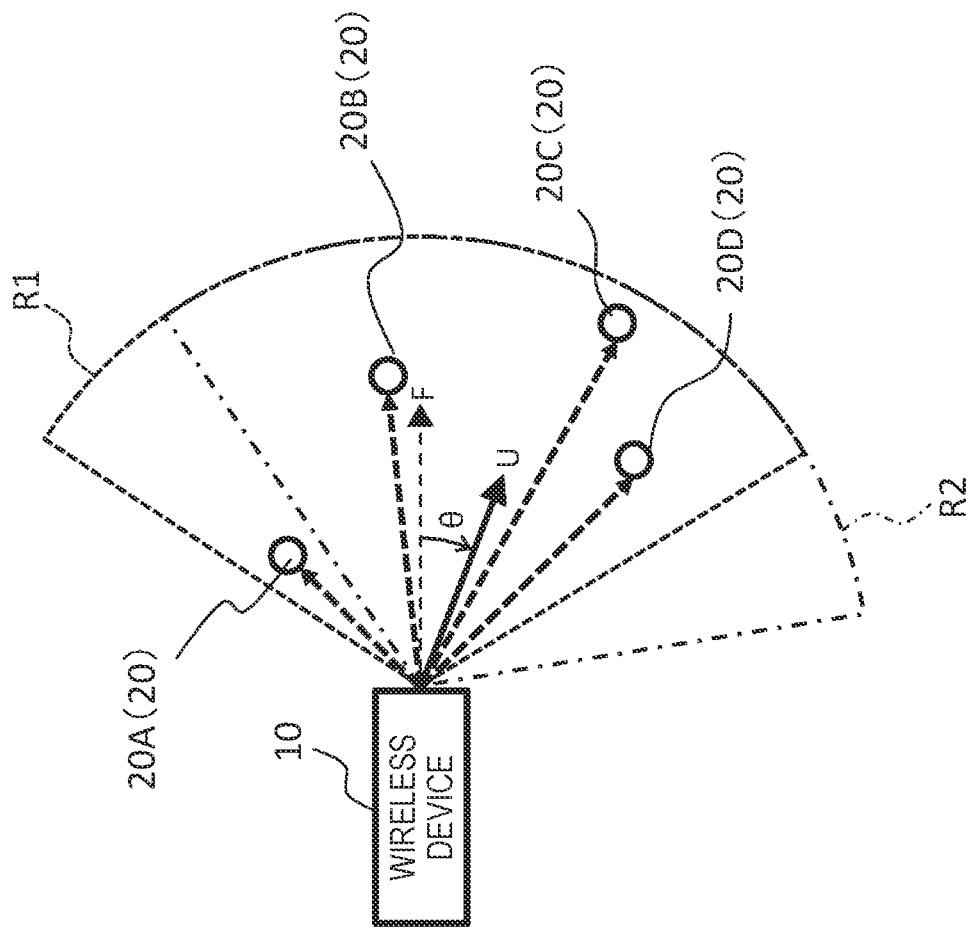
FIG. 7 is a conceptual diagram showing an example in which the wireless device according to the present embodiment determines a recommended antenna direction within a range in which a wireless communication target terminal among the terminals is not outside a communication area.

FIG. 7 is a conceptual diagram showing an example in which the wireless device 10 determines the recommended direction U of the antenna 15 within the range in which the wireless communication target terminal among the terminals 20 is not outside the communication area.

A region R1 shown by a dotted line conceptually shown as a fan shape indicates the communication area according to the current direction F of the antenna 15. A region R2 shown by an alternate long and short dash line conceptually shown as a fan shape indicates the communication area of the wireless device 10 in a case where the direction of the antenna 15 is changed to the recommended direction U of the antenna 15 determined in step S23.

The terminals 20A, 20B, 20C, and 20D are all included in the fan-shaped region R1. That is, these terminals 20A to 20D are located in the communication area of the wireless device 10. The terminal 20B, the terminal 20C, and the terminal 20D are included in the fan-shaped region R2. However, the terminal 20A is not in the region R2. As described above, when the direction of the antenna 15 is changed, the wireless communication target terminal may be located outside the communication area. In order to avoid such a situation, in step S24, the processor 11 determines whether there is any wireless communication target terminal located outside the communication area when the antenna 15 is set in the recommended direction U determined in step S23. Then, in step S25, the processor 11 determines the recommended direction U of the antenna 15 within the range in which the wireless communication target terminal among the terminals 20 is not outside the communication area. It should be noted that the wireless communication target terminal in the present embodiment refers to each of the terminal 20A, the terminal 20B, the terminal 20C, and the terminal 20D.

For example, it is assumed that the angle θ of the current direction F of the antenna 15 is 0 degree, and the angle θ of the recommended direction U of the antenna 15 determined in step S23 is 40 degrees. Here, in a case where the terminal 20A is outside the communication area if the angle θ of the direction of the antenna 15 is changed from 0 degree to 40 degrees, the processor 11 determines the angle θ of the recommended direction U of the antenna 15 to be a value such as 25 degrees so as to allow the terminal 20A to enter the communication area.

When the terminal 20A is not a target of wireless communication with the wireless device 10, the process of step S25 is unnecessary. As an example of such a case, there may be a case where the terminal 20A is in a communication area of another wireless device different from the wireless device 10.

Figure 8:
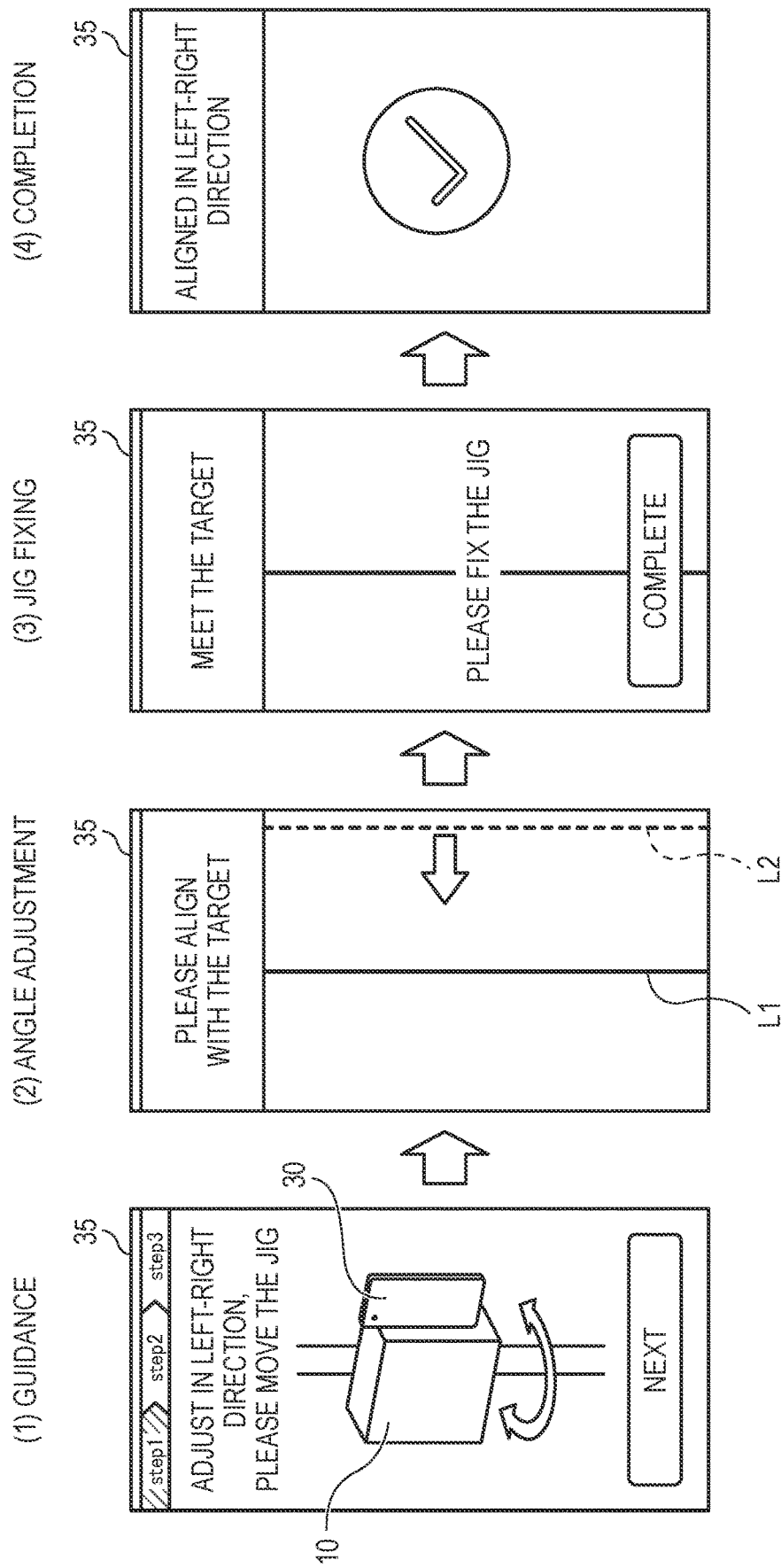
FIG. 8 shows an example of notification of the recommended antenna direction performed by the management device according to the present embodiment.

FIG. 8 shows an example of notification of the recommended direction U of the antenna 15 performed by the management device 30 corresponding to step S15 of FIG. 3.

In the present embodiment, a case where the management device 30 is a smartphone will be described as an example.

The management device 30 acquires information indicating the recommended direction U of the antenna 15 determined by the wireless device 10 from the wireless device 10 via the connection interface 33. Then, the processor 31 of the management device 30 causes the display device 35 to display information indicating difference (for example, the angle θ) between the recommended direction U of the antenna 15 determined by the wireless device 10 and the current direction F of the antenna 15 of the wireless device 10, for example, as follows.

When the management device 30 is the smartphone, a touch panel screen included in the smartphone corresponds to the display device 35. An operator inserts the management device 30 into a fixing slot or the like provided in the wireless device 10. As a result, the wireless device 10 and the management device 30, which is the smartphone, are integrated with each other, and can rotate without changing relative positions thereof.

A guidance screen is displayed on the display device 35. The wireless device 10 and the management device 30 are displayed on the guidance screen. On the guidance screen, a text message "adjust in left-right direction, please move the jig", an arrow indicating a direction where the jig is moved, and a "next" button are displayed. When the operator taps the "next" button on such a guidance screen, the processor 31 causes the display device 35 to display an angle adjustment screen.

In the angle adjustment screen, the processor 31 causes the display device 35 to display a vertical line L1 indicating a target optimal azimuth of the wireless device 10 and a vertical line L2 indicating a current azimuth of the wireless device 10. The optimal azimuth indicated by the vertical line L1 is an azimuth based on information indicating the recommended direction U of the antenna 15 acquired from the wireless device 10. The current azimuth indicated by the vertical line L2 corresponds to, for example, the current direction F of the antenna 15 included in the management device 30, which corresponds to a current direction of the smartphone calculated based on a gyro of the management device 30, namely the smartphone. In addition, the processor 31 causes the display device 35 to display a text message "please align with the target". The operator rotates the wireless device 10 integrated with the management device 30 in a direction where the vertical line L2 coincides with the vertical line L1.

When the vertical line L2 and the vertical line L1 coincide with each other, the processor 31 causes the display device 35 to display a jig fixing screen. On the jig fixing screen, the processor 31 displays text messages "meet the target" and "please fix the jig", and a "complete" button. When the operator selects (for example, taps) the "complete" button, the processor 31 causes the display device 35 to display a completion screen. On the completion screen, the processor 31 causes the display device 35 to display a text message "aligned in left-right direction" and a check mark indicating completion of the operation.

For example, when the processor 31 causes the display device 35 to display as described above, the installation operator of the wireless device 10 can easily adjust the direction of the antenna 15 of the wireless device 10 to the recommended direction U while viewing the display device 35.

It should be noted that the display mode shown in FIG. 8 is merely an example. The processor 31 may cause the display device 35 to display the information indicating the difference between the recommended direction U of the antenna 15 determined by the wireless device 10 and the current direction F of the antenna 15 of the wireless device 10 in a mode different from that described above.

As a modification, the processor 31 may output the information indicating the difference between the recommended direction U of the antenna 15 determined by the wireless device 10 and the current direction F of the antenna 15 of the wireless device 10 to an audio output device such as a speaker. The processor 31 may cause the audio output device to output, for example, a sound effect whose pitch increases as the difference decreases, a continuous sound whose beats per minute (BPM) increases as the difference decreases, or the like.

A case where the operator manually changes the direction of the wireless device 10 has been described above. However, the direction of the wireless device 10 may be changed by automatic control. For example, the wireless device 10 is mounted on a device including a rotation mechanism such as a gimbal. Then, the processor 11 of the wireless device 10 controls an operation of the gimbal such that the antenna 15 included in the wireless device 10 coincides with the determined recommended direction U of the antenna 15. The device including the rotation mechanism may also be a device other than the gimbal.

<Modification of Method of Calculating Antenna Direction>

Figure 9:
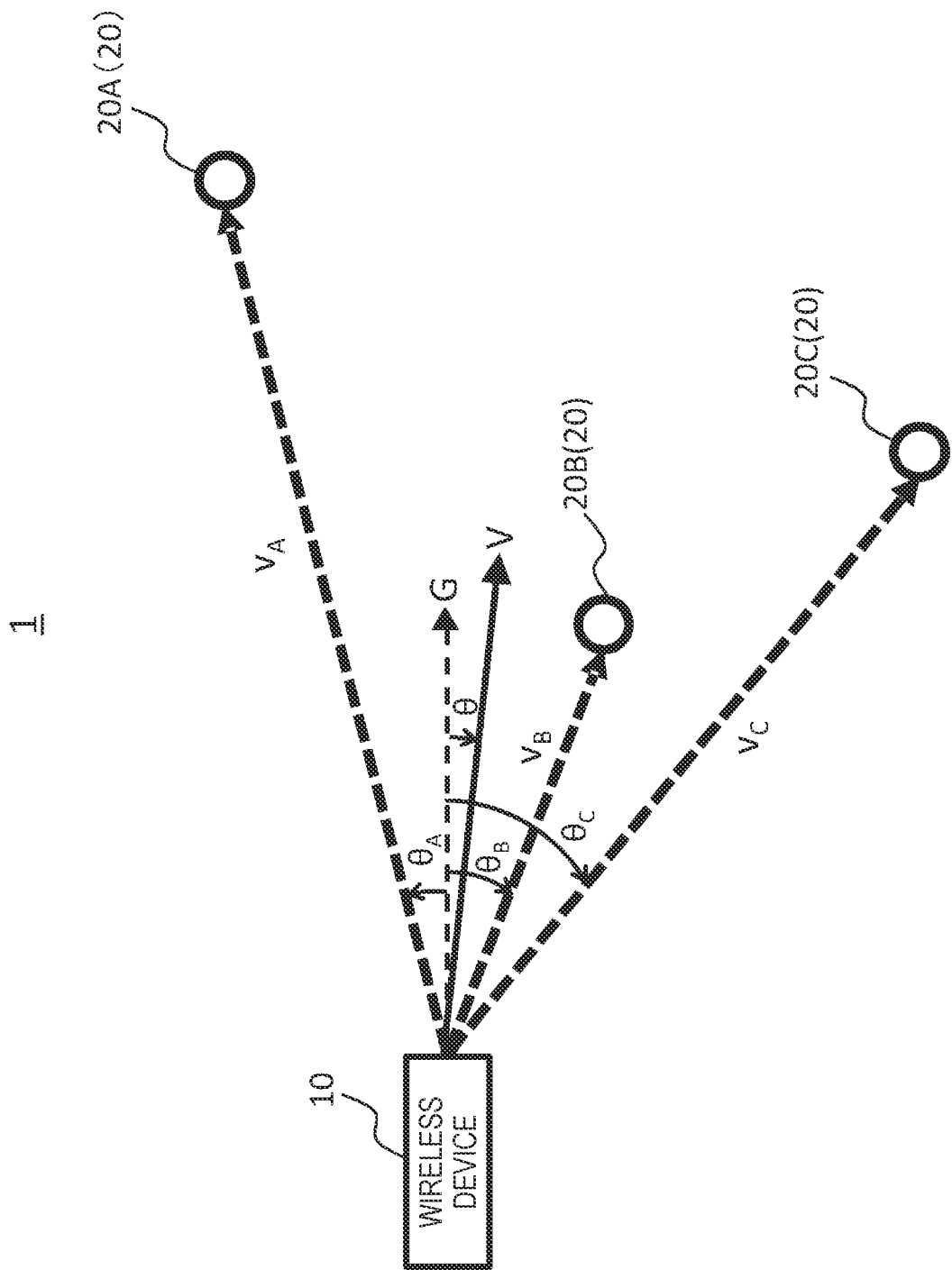
FIG. 9 is a conceptual diagram showing a modification of a method of calculating the recommended antenna direction according to the present embodiment.

Next, a modification of the method of calculating the recommended direction of the antenna 15 will be described with reference to FIG. 9. FIG. 9 is a conceptual diagram showing the modification of the method of calculating the recommended direction of the antenna 15 according to the present embodiment.

As shown in FIG. 9, a vector from a position of the wireless device 10 to a position of the terminal 20A is represented by $v_A$, a vector from the position of the wireless device 10 to a position of the terminal 20B is represented by $v_B$, and a vector from the position of the wireless device 10 to the terminal 20C is represented by $v_C$. A length of the vector $v_A$ corresponds to the distance from the wireless device 10 to the terminal 20A. A length of the vector $v_B$ corresponds to the distance from the wireless device 10 to the terminal 20B. A length of the vector $v_C$ corresponds to the distance from the wireless device 10 to the terminal 20C. The wireless device 10 may set a direction of a combined vector V obtained by combining the vectors $v_A$, $v_B$, and $v_C$ as the recommended direction V of the antenna 15.

The wireless device 10 may calculate the angle θ formed by a vector G indicating the original direction of the antenna 15 and the combined vector V indicating the recommended direction of the antenna 15 as follows.

Coordinates of the vector $v_A$ on a horizontal plane are represented by ($A \cos \theta_A$, $A \sin \theta_A$), coordinates of the vector $v_B$ on the horizontal plane are represented by ($B \cos \theta_B$, $B \sin \theta_B$), and coordinates of the vector $v_C$ on the horizontal plane are represented by ($C \cos \theta_C$, $C \sin \theta_C$). Here, A may be a value corresponding to the length of the vector $v_A$ or the weighting coefficient related to the terminal 20A, B may be a value corresponding to the length of the vector $v_B$ or the weighting coefficient related to the terminal 20B, and C may be a value corresponding to the length of the vector $v_C$ or the weighting coefficient related to the terminal 20C. The weighting coefficients are as described above. In addition, $\theta_A$ is an angle formed by the vector G and the vector $v_A$, $\theta_B$ is an angle formed by the vector G and the vector $v_B$, and $\theta_C$ is an angle formed by the vector G and the vector $v_C$.

In this case, the wireless device 10 may calculate the angle θ formed by the vector G and the combined vector V by $D \cos \theta = A \cos \theta_A + B \cos \theta_B + C \cos \theta_C$ or $D \sin \theta = A \sin$ $\theta_A$+B sin $\theta_B$+C sin $\theta_C$. D may be a value calculated based on the values of A, B, and C.

The wireless device 10 may use the angle θ indicating the recommended direction of the antenna 15 calculated in this manner in the angle adjustment shown in FIG. 8.

In addition, the clustering described with reference to FIG. 6 may be performed while the positions of the terminals 20 are expressed by the vectors as shown in FIG. 9. In this case, since a position of a center of gravity of the cluster can be expressed by a vector, the wireless device 10 may calculate the combined vector V by combining a plurality of vectors indicating the position of the center of gravity of the cluster, and may calculate the angle θ formed by the vector G and the combined vector V in the same manner as described above.

Summary of Present Disclosure

Contents of the present disclosure can be expressed as follows.

<Expression 1>

The wireless device 10 that is capable of performing wireless communication with at least one terminal 20 includes the antenna 15 capable of wireless communication. The wireless device 10 includes the wireless interface 14 that performs wireless communication with each terminal 20 through the antenna 15. The wireless device 10 includes the processor 11 that acquires the azimuths of the terminals 20 and the weighting coefficients of the terminals 20 and determines the direction of the antenna 15 based on the azimuths of the terminals 20 and the weighting coefficients of the terminals.

As a result, the processor 11 can determine the recommended direction of the antenna 15 in such a manner that the wireless device 10 can allow beams to reach the terminals 20 without imbalance.

<Expression 2>

In the wireless device 10 described in Expression 1, the weighting coefficient of the terminal 20 that is distant may be larger than the weighting coefficient of the terminal 20 that is nearby.

As a result, although it is considered that the communication quality of the distant terminal 20 is lower than that of the nearby terminal 20, it is possible to allow the beams in the beam forming to reach the terminals 20 without imbalance.

<Expression 3>

In the wireless device 10 described in Expression 1 or 2, the weighting coefficient of the terminal 20 with weak received power in the wireless device 10 may be larger than the weighting coefficient of the terminal 20 with strong received power in the wireless device 10.

As a result, although it is considered that the communication quality of the terminal 20 with weak received power is lower than that of the terminal 20 with strong received power, it is possible to allow the beams in the beam forming to reach the terminals 20 without imbalance.

<Expression 4>

In the wireless device 10 described in any one of Expressions 1 to 3, the weighting coefficient of the terminal 20 with high importance may be larger than the weighting coefficient of the terminal 20 with low importance.

As a result, the recommended direction of the antenna 15 can be directed into an azimuth where communication quality is improved for the terminal 20 with high importance.

<Expression 5>

In the wireless device 10 described in any one of Expressions 1 to 4, the processor 11 may perform clustering such that one or more terminals 20 belong to one cluster, and determine the weighting coefficient by regarding the cluster as one terminal 20.

When the weighting coefficient is determined for each of a plurality of terminals 20 that are located close to each other, the direction of the antenna 15 may be excessively close to a direction where the plurality of terminals 20 are present. According to the above configuration, when there are a plurality of terminals 20 located close to each other, the plurality of terminals 20 are regarded as one terminal 20, and thus the recommended direction of the antenna 15 is not excessively close to the direction where the plurality of terminals 20 are present. Therefore, the antenna 15 can be directed into an appropriate direction.

<Expression 6>

In the wireless device 10 described in any one of expressions 1 to 5, the processor 11 may determine the direction of the antenna within the range in which the wireless communication target terminal 20 among the terminals 20 is not outside the communication area.

As a result, when the direction of the antenna 15 is changed, the terminals 20 can be prevented from being located outside the communication area and thus being unable to perform wireless communication.

<Expression 7>

The management device 30 connectable to the wireless device 10 includes the display device 35, and the processor 31 that causes the display device 35 to display the information indicating the difference between the direction of the antenna 15 determined by the wireless device 10 and the current direction of the antenna 15 of the wireless device 10.

As a result, the operator can adjust the direction of the antenna 15 while viewing the information indicating the difference displayed on the display device 35, and thus can easily set the antenna 15 to an appropriate direction.

<Expression 8>

The wireless device 10 includes the antenna 15 that is capable of wireless communication. Then, in the antenna direction determination method of determining the direction of the antenna 15, the azimuths of the terminals 20 and the weighting coefficients of the terminals 20 are acquired, and the direction of the antenna 15 is determined based on the azimuths of the terminals 20 and the weighting coefficients of the terminals 20.

As a result, the processor 11 can determine the recommended direction of the antenna 15 in such a manner that the wireless device 10 can allow beams to reach the terminals 20 without imbalance.

Although the embodiment has been described with reference to the accompanying drawings, the present disclosure is not limited to such an example. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, the constituent elements in the above-described embodiment may be combined as desired without departing from the gist of the invention.

The present disclosure is useful as a wireless device, a management device, and an antenna direction determination method capable of directing a directional antenna included in the wireless device to an appropriate azimuth.

What is claimed is:

1. A wireless device configured to perform wireless communication with one or more terminals, the wireless device comprising:
   an antenna configured to perform wireless communication;
   a wireless interface configured to perform wireless communication with the one or more terminals through the antenna; and
   a processor configured to acquire an azimuth and a weighting coefficient of each of the one or more terminals, and determine a direction of the antenna based on the azimuth and the weighting coefficient of each of the one or more terminals.

2. The wireless device according to claim 1, wherein a weighting coefficient of a terminal distant from the wireless device among the one or more terminals is larger than a weighting coefficient of a terminal close to the wireless device among the one or more terminals.

3. The wireless device according to claim 1, wherein a weighting coefficient of a terminal with weak received power in the wireless device among the one or more terminals is larger than a weighting coefficient of a terminal with strong received power in the wireless device among the one or more terminals.

4. The wireless device according to claim 1, wherein a weighting coefficient of a terminal with high importance among the one or more terminals is larger than a weighting coefficient of a terminal with low importance among the one or more terminals.

5. The wireless device according to claim 1, wherein the processor performs a clustering such that at least one terminal among the one or more terminals belongs to one cluster, and determines the weighting coefficient by regarding the cluster as one terminal.

6. The wireless device according to claim 1, wherein the processor determines the direction of the antenna within a range in which a wireless communication target terminal among the one or more terminals is not outside a communication area of the antenna.

7. A management device connectable to the wireless device according to claim 1, comprising:
   a display device; and
   a processor configured to cause the display device to display information indicating a difference between the direction of the antenna determined by the wireless device and a current direction of the antenna of the wireless device.

8. An antenna direction determination method for determining a direction of an antenna provided on a wireless device and configured to perform wireless communication, the antenna direction determination method comprising:
   acquiring an azimuth and a weighting coefficient of each of one or more terminals; and
   determining the direction of the antenna based on the azimuth and the weighting coefficient of each of the one or more terminals.

9. The antenna direction determination method according to claim 8, wherein a weighting coefficient of a terminal distant from the wireless device among the one or more terminals is larger than a weighting coefficient of a terminal close to the wireless device among the one or more terminals.

10. The antenna direction determination method according to claim 8, wherein a weighting coefficient of a terminal with weak received power in the wireless device among the one or more terminals is larger than a weighting coefficient of a terminal with strong received power in the wireless device among the one or more terminals.

11. The antenna direction determination method according to claim 8, wherein a weighting coefficient of a terminal with high importance among the one or more terminals is larger than a weighting coefficient of a terminal with low importance among the one or more terminals.

12. The antenna direction determination method according to claim 8, further comprising:
   performing a clustering such that at least one terminal among the one or more terminals belongs to one cluster, and determining the weighting coefficient by regarding the cluster as one terminal.

13. The antenna direction determination method according to claim 8, wherein in the determining process, the direction of the antenna is determined within a range in which a wireless communication target terminal among the one or more terminals is not outside a communication area of the antenna.

* * * * *